Sept. 29, 1959     T. COLLINS ET AL     2,907,036
GRAIN VENTILATING TUNNEL
Filed Aug. 5, 1954     4 Sheets-Sheet 1
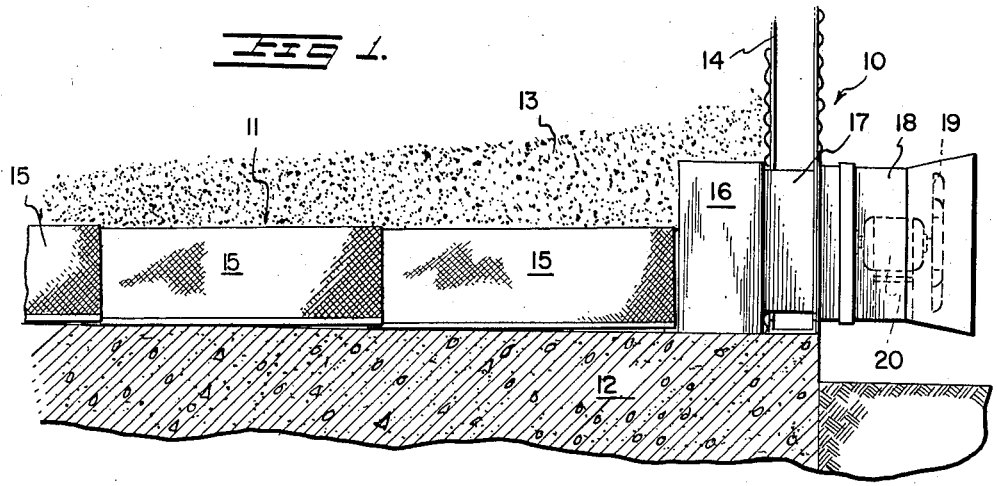
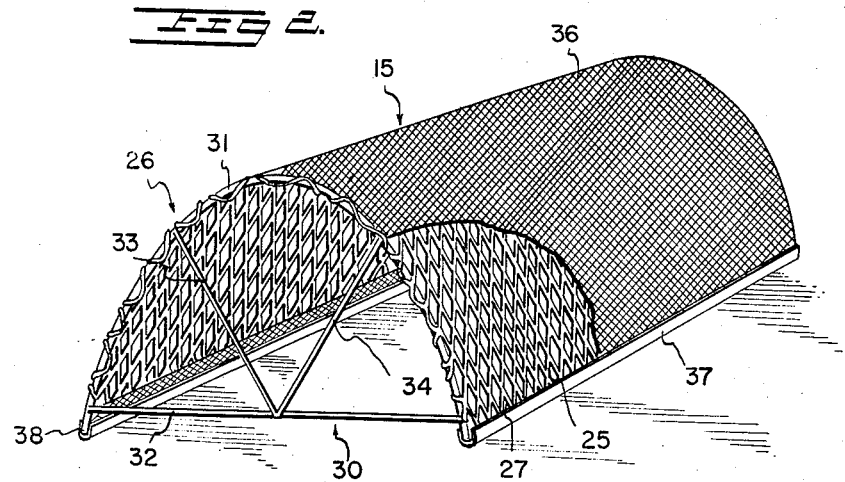
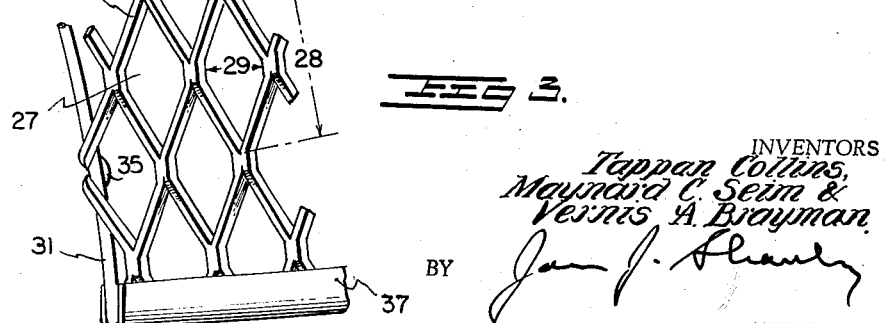
INVENTORS
Tappan Collins,
Maynard C. Seim &
Vernis A. Brayman.
BY
ATTORNEY Sept. 29, 1959  T. COLLINS ET AL  2,907,036
GRAIN VENTILATING TUNNEL
Filed Aug. 5, 1954  4 Sheets-Sheet 2
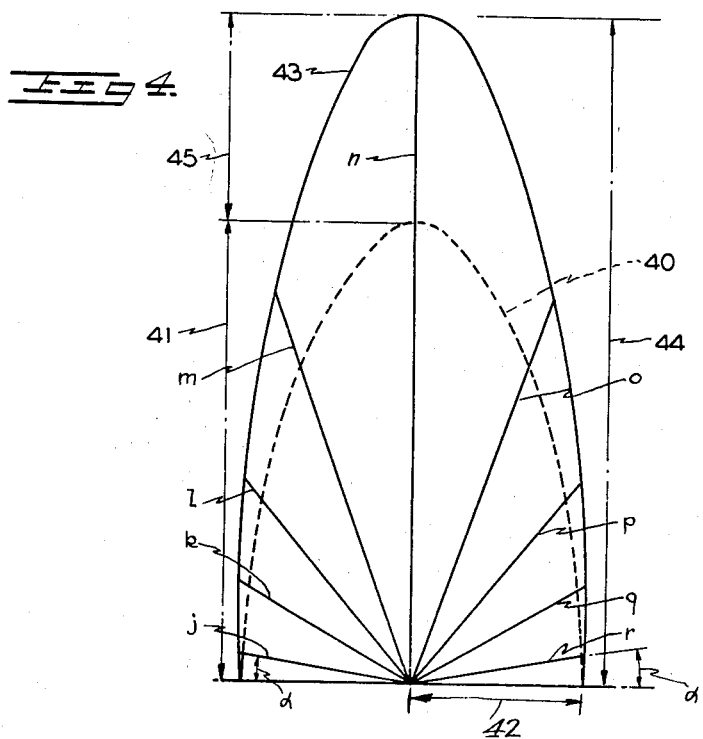
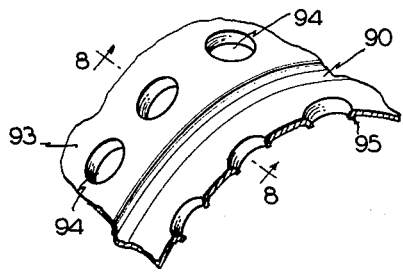
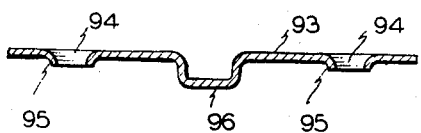
INVENTORS
Tappan Collins,
Maynard C. Seim &
Vernis A. Brayman
BY
ATTORNEY Sept. 29, 1959 T. COLLINS ET AL 2,907,036
GRAIN VENTILATING TUNNEL
Filed Aug. 5, 1954 4 Sheets-Sheet 3
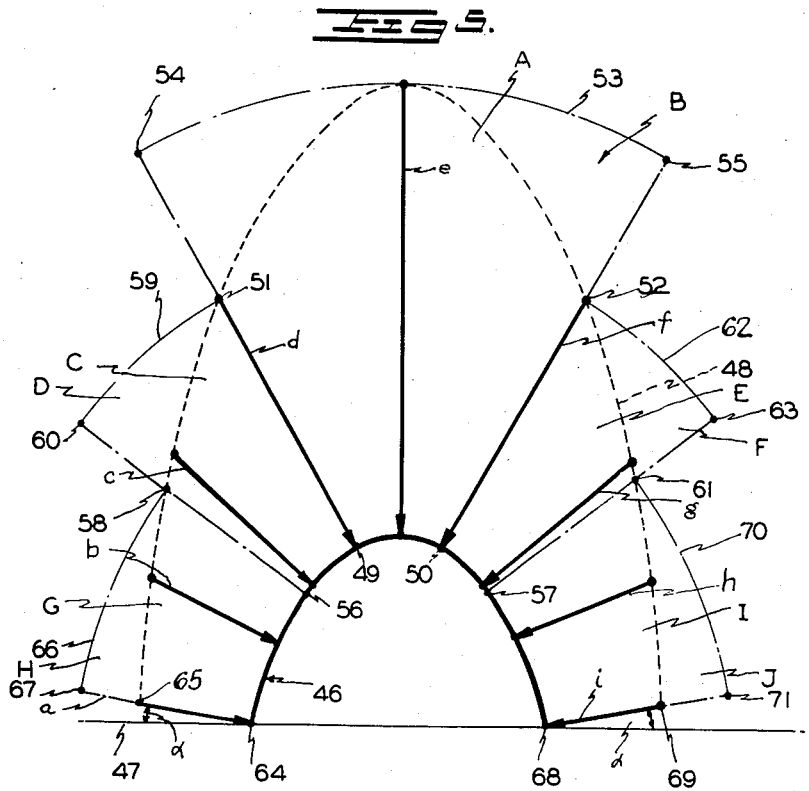
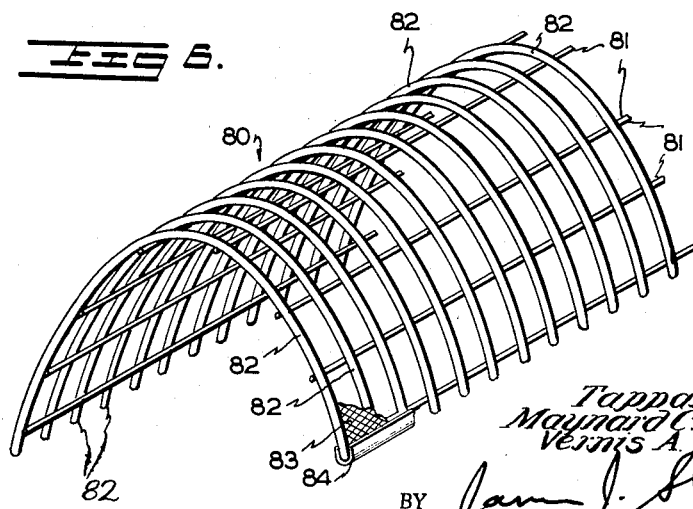
INVENTORS
Tappan Collins,
Maynard C. Seim &
Vernis A. Brayman.
BY
ATTORNEY

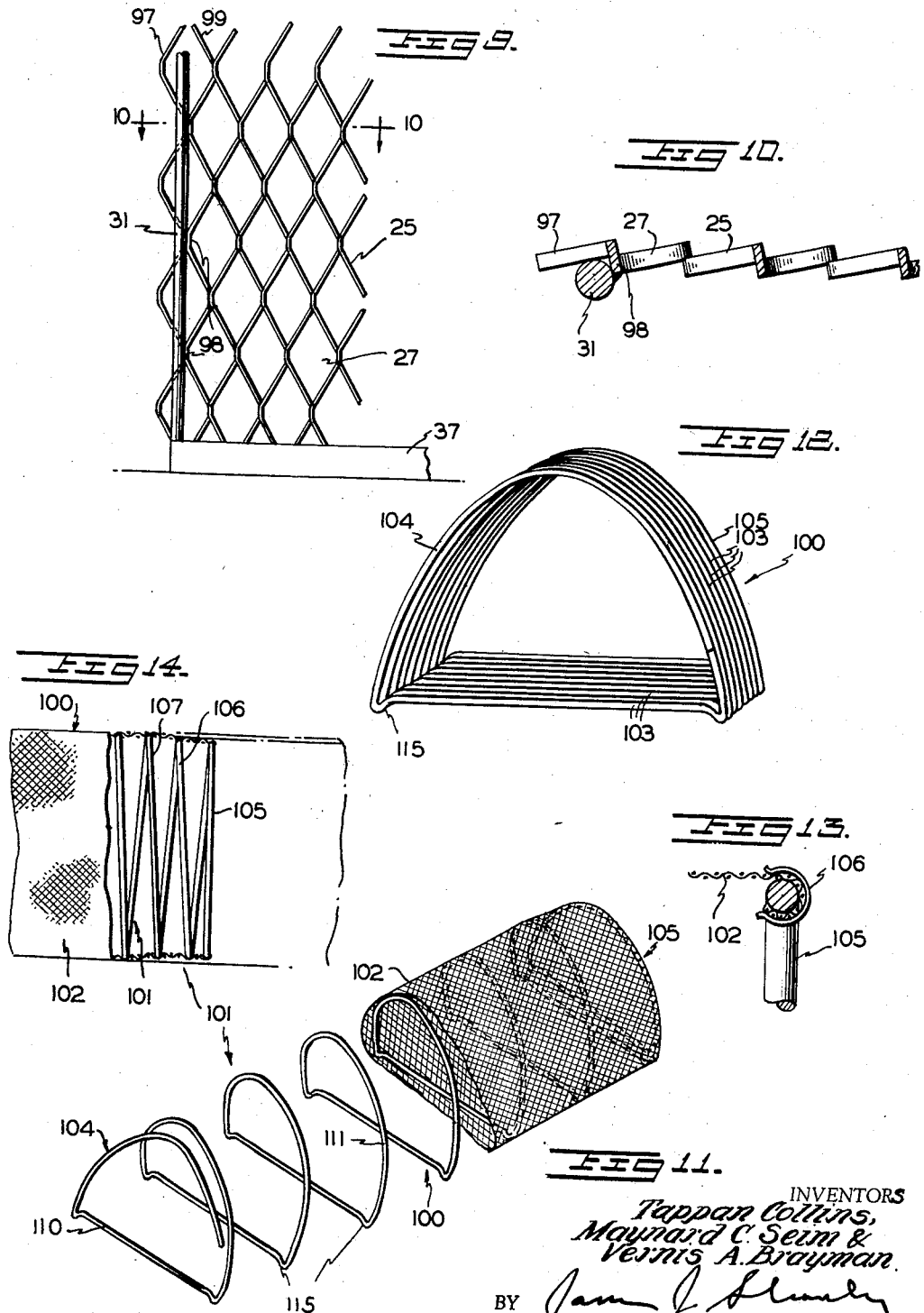

United States Patent Office 2,907,036
Patented Sept. 29, 1959

2,907,036

GRAIN VENTILATING TUNNEL

Tappan Collins, Grosse Pointe Woods, Maynard C. Seim, Nankin Township, Wayne County, and Vernis A. Brayman, Wyandotte, Mich., assignors to National Steel Corporation, a corporation of Delaware Application August 5, 1954, Serial No. 448,107

9 Claims. (Cl. 98—56)

This invention relates to grain storage, and more particularly to ventilating tunnels for use in grain storage buildings.

Today large quantities of grain are stored for extended periods of time in buildings especially designed for that purpose. The type of building most generally employed is of a type that may be erected at relatively low cost and usually comprises elongated concrete slab flooring upon which the grain is piled and elongated walls and an arched roof surrounding the flooring and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose a ventilating tunnel is first placed on the floor and then the grain is piled on the floor so as to cover the tunnel. The tunnel is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally, there are two types of grain ventilation problems. One is the removal of excessive moisture from grain, and the other is the controlling of the moisture distribution through the mass of grain to prevent spoilage arising from the gradual development of concentrations of moisture in regions of the grain mass. The ventilating tunnel provided by the present invention may be employed to solve either problem.

When it is desired to remove excessive moisture from stored grain a relatively large rate of air must be circulated through the mass of grain. For this reason it is necessary to provide ventilating tunnels of relatively large cross-sectional area. In cases where the grain stored includes the desired moisture content and only safe storage is to be provided, it is required that only a relatively small rate of air be circulated through the mass of grain, and the air circulation may be discontinuous. Consequently, ventilating tunnels of relatively smaller cross-sectional area may be employed for grain ventilation where there is no problem of moisture removal.

When grain of the desired moisture content is stored in a pile and left unventilated, the moisture in the grain will migrate to the top of the pile of grain producing undesirable regions of the grain mass having excessive concentrations of moisture. In order to overcome this moisture migration, air is circulated downwardly through the grain, that is, in a direction opposite the direction of moisture migration. For this purpose the air may be circulated for extended periods at a relatively low rate so that the grain has a substantially constant moisture content substantially throughout its volume. Thus the ventilating tunnel is connected to a suction fan or blower and air is forced downwardly through the grain. Of course tunnels designed for moisture removal or grain drying may be employed thereafter for controlling moisture distribution by providing a reduced air flow directed downwardly through the grain. However, in view of the relative size of the two types of ventilating tunnels it would be uneconomical to employ drying tunnels for grain ventilation when moisture removal is not required.

Grain ventilating tunnels provided heretofore are manufactured in sections designed to be nested together for reduced volume in shipment from the place of manufacture to the site of the grain storage building. However, the designs of the prior tunnel sections require the use of a plurality of relatively heavy metal structural members so that the tunnel will be capable of carrying the large loads involved. The requirement of relatively heavy metal structural members substantially increases the manufacturing costs of the tunnel sections due to the quantity of metal needed and the necessary additional manufacturing steps. Also these prior tunnel sections being relatively heavy increases the cost of shipment from the manufacturing plant to the site of use. A large number of linear feet of ventilating tunnel is required in the storage of grain. For example, in one case the United States Department of Agriculture requires that a building 100 feet long and 40 feet wide having a storage capacity of somewhat over 38,000 bushels of grain shall be provided with one tunnel 96 feet long extending into the building from one end. It is thus seen that the total cost of the ventilating tunnel at the storage building has a material bearing upon the cost of storing the grain, and, in view of the large quantity of grain presently stored, a relatively small reduction in the cost of each ventilating tunnel will result in a material decrease in the overall cost of grain storage.

It is therefore an object of the present invention to provide a novel grain ventilating tunnel construction that overcomes the problems outlined above.

Another object is to provide a novel grain ventilating tunnel section that may be manufactured and delivered to the site of the grain storage building at a relatively low cost as compared to the cost of ventilating tunnel sections constructed in accordance with the prior art.

Another object is to provide a novel ventilating tunnel for use in grain storage buildings capable of delivering a specified flow of air at low velocity for complete ventilating of the grain, the tunnel being constructed in such a manner as to reduce to a minimum obstructions to the flow of air through the tunnel.

Another object is to provide a novel tunnel section adapted to be interconnected with a plurality of corresponding sections to form an elongated ventilating tunnel not requiring special devices or difficult, time-consuming manipulations to interconnect the sections.

Still another object of the present invention is to provide a novel grain ventilating tunnel section not requiring the inclusion of relatively large metallic structural members yet being capable of carrying the heavy loads involved when used as a grain ventilating tunnel.

Still another object is to provide a grain ventilating tunnel section of the above character that may be produced at low cost by a few relatively simple manufacturing steps.

A still further object of the present invention is to provide a grain ventilating tunnel made up of a plurality of tunnel sections each having a cross-sectional shape of novel design determined upon consideration of the actual loading of the grain on the ventilating tunnel and of the "passive resistance" of the grain, which eliminates unnecessary use of relatively large structural members in the formation of the grain ventilating tunnel sections and which materially decreases the manufacturing and shipping costs.

Other objects and features of the present invention will appear more fully from the following detailed description considered in connection with the accompanying drawings which disclose several embodiments of the invention. It is expressly understood, however, that the drawings are designed for purposes of illustration only and not as a definition of the limits of the invention, reference for the latter purpose being had to the appended claims.

In the drawings, in which similar reference characters denote similar elements throughout the several views:

Fig. 1 is a view in section of a portion of a grain storage building including a ventilating tunnel constructed in accordance with the principles of the present invention;

Fig. 2 is an isometric view, partly broken away, of a grain ventilating tunnel section embodying the principles of the present invention;

Fig. 3 is an enlarged view of a portion of the grain ventilating tunnel section shown in Fig. 2;

Fig. 4 is a diagrammatic presentation graphically illustrating the semi-ellipse of pressure presented by a mass of piled grain as defined by specific requirements of the United States Department of Agriculture and as modified in accordance with the principles of the present invention;

Fig. 5 is a graphical presentation of the load on a grain tunnel section by a pile of grain presenting the semi-ellipse of pressure shown in Fig. 4, the tunnel section being arch-shaped according to the present invention;

Fig. 6 is an isometric view of a tunnel section constructed in accordance with another embodiment of the present invention;

Fig. 7 is a fragmentary view of a still further embodiment of the present invention;

Fig. 8 is a view in section taken along the line 8—8 of Fig. 7;

Fig. 9 is an enlarged fragmentary view of a tunnel section constructed in accordance with the principles of the present invention illustrating a modification of a construction detail;

Fig. 10 is a view in section taken along the line 10—10 of Fig. 9;

Fig. 11 is an isometric view, partly broken away, of a grain ventilating tunnel section constructed in accordance with another embodiment of the present invention;

Fig. 12 is an isometric view of a portion of the ventilating tunnel shown in Fig. 11 illustrated in its collapsed position;

Fig. 13 is a detail view in section illustrating a construction feature of the tunnel section shown in Fig. 11; and Fig. 14 is a view in side elevation, partly broken away and partly in phantom, illustrating a structural detail of the tunnel section shown in Fig. 11 and the manner in which a plurality of such tunnel sections may be joined together to form an elongated ventilating tunnel.

With reference more particularly to Fig. 1 of the drawings, a grain storage building 10 is shown therein provided with a grain ventilating tunnel 11 constructed in accordance with the principles of the present invention. The building 10 includes an end wall 14, and side walls, another end wall and a roof, not shown, and is provided with a concrete slab flooring 12 upon which a mass of grain 13 is supported in a pile. The ventilating tunnel 11 is made up of a plurality of tunnel sections 15 positioned in overlapping, end-to-end relation. One end of the first tunnel section, that is, the tunnel section on the right as viewed in the drawing, is connected to an adapter 16. The adapter 16 may be formed of sheet metal to provide a chamber communicating with the first section of the tunnel through a suitable opening at one of its ends, and being provided at its other end with an extension 17 passing through the end wall 14 and joined to a fan housing 18. A fan 19 driven by an electric motor 20 is positioned within the fan housing 18 and is adapted upon operation to circulate air through the grain by way of the grain ventilating tunnel. The grain ventilating tunnel 11, as will be more fully described below, is provided with a plurality of passageways in its outer wall or surface for the passage of circulating air through the walls of the ventilating tunnel sections.

Construction of a grain ventilating tunnel section according to one embodiment of the present invention is shown more clearly in Figs. 2 and 3 of the drawings. The tunnel sections are identical and only one will be described in detail. As shown, each tunnel section is formed from a single piece of sheet metal 25 bent in the form of an arch of particular shape to provide an elongated arch structure 26 extending throughout the length of the sheet metal, details of the particular shape of the arch being described more fully below. The sheet metal 25 is provided with a plurality of openings 27 for two important reasons. First, the openings 27 provide passageways in the walls of the tunnel for the flow of circulating air therethrough. Second, according to the present invention, it is proposed to employ sheet material for the sheet metal 25 which possesses small thickness as compared to the area of the pieces of sheet metal. Use of such material reduces the quantity of metal employed in manufacturing each tunnel section and presents a material that may be deficient in beam strength. As described more fully below, tunnels constructed in accordance with the principles of the present invention do not rely upon the beam strength of the sheet metal forming the tunnel sections for supporting the heavy grain loads although some beam characteristics are required. The necessary beam strength may be obtained in light-gage sheet metal by the manner of providing the openings in the sheet metal for the passage of circulating air through the walls of the tunnels. As shown, the piece of sheet metal 25 may comprise a piece of expanded metal in which the openings 27 may be diamond-shaped having unequal length and width dimensions 28 and 29, respectively. The expanded sheet metal is bent into the arch structure 26 with the smaller width dimension 29 of the openings 27 parallel to the longitudinal axis of the tunnel section and with the longer length dimension 28 extending in the direction of curvature of the sheet metal. This manner of bending the expanded sheet metal provides the greatest possible arch strength since the expanded sheet metal is stronger in the direction of the length dimensions 28 and thus allows use of lighter gage material. Of course the sheet metal 25 may comprise materials other than expanded metal, and may be provided with openings of different form, such as rectangular or circular.

Although, for reasons described below, the elongated arch structure 26 is not subject to failure by flexure in normal use as a grain ventilating tunnel, arch shape maintaining means is provided for insuring the proper cross-sectional shape of the tunnel section to prevent changes in the arch shape while shipping and assembling the sections. This means comprises a non-load bearing structure 30 secured to the elongated arch structure 26 at only one of its ends. The structure 30 is formed from small diameter wire and includes an arch portion 31 which has a shape corresponding to the desired arch shape of the tunnel section. The ends of the arch portion 31 are connected together by a transverse member 32 and are braced at spaced points of the arch portion 31 by radial arms 33 and 34. The structure 30 may be secured to the inside surface of the sheet metal 25 adjacent an end of the structure 26 by means of welds, as described below, or it may be secured to the sheet metal 25 by bending portions 35 of the sheet metal 25 around the member 31 in clamping relation, as shown in Figs. 2 and 3 of the drawings. The structure 30 not only insures the proper arch shape of the tunnel section, but also prevents unauthorized or undesired use of the tunnel as a crawling space.

The openings 27 in the sheet metal 25 are relatively large as compared to the area of the metal so that air may pass freely through the walls of the tunnel sections. In order to prevent grain from passing through the openings 27 into the tunnel section a piece of screen 36 of fine mesh is positioned on the outside of the elongated arch structure 26 throughout its total area. The mesh of the screen is such that the openings therein are smaller than the size of grain particles. The screen 36 may be secured to the elongated arch structure 26 along the edges of the piece of sheet metal 25 by means of U-shaped members 37 and 38. The members 37 and 38 extend throughout the length of the tunnel section and open upwardly, and each member receives a lower longitudinal edge of the piece of sheet metal 25 and an edge of the screen 36. The edges of the screen 36 may be bent around the edges of the sheet metal 25 before being inserted into the members 37 and 38. After the sheet metal 25 and the screen 36 are positioned in the members 37 and 38, the side portions of the members may be crimped together to clamp therebetween the sheet metal and the screen and thus securely attach the fine mesh screen onto the elongated arch structure 26.

When the tunnel sections of the type shown in Fig. 2 are positioned in overlapping end-to-end relation to form a ventilating tunnel 11 as shown in Fig. 1, the ends of the tunnel sections not including the arch maintaining structure 30 are positioned over the end of an adjacent tunnel section including the structure 30. This positioning of the tunnel sections in slight overlapping relation results in an arrangement in which the bottom edges of the members 37 and 38 do not lie flat on the floor of the grain storage building but are inclined with respect to the floor as shown in Fig. 1. It has been determined that this angular positioning of the tunnel sections with respect to the supporting floor has no material effect upon the load carrying characteristics of the tunnel sections, or of a tunnel formed from a plurality of sections positioned in this manner. However, if desired, each of the tunnel sections may be of a tapered construction in which the arch at the end of the tunned section including the structure 30 is slightly smaller than the arch at the other end of the tunnel section, so that, when the sections are positioned together in overlapping end-to-end relation, the longitudinal edges of the section will lie flat upon the supporting floor. The same result may be obtained by positioning the members 37 and 38 at the proper angle with respect to the longitudinal axis of the tunnel sections.

It is well known that a mass of grain acts as a semi-fluid and a non-uniform pressure is applied onto a body covered by a pile of grain as distinguished from a uniform pressure surrounding a body submerged in a liquid. The pressure applied on a body by a semi-fluid material may be represented by the semi-diameter of an ellipse normal to the slope of the body at the point of application of the pressure. The size of the ellipse is defined by major and minor semi-diameters representing the vertical and horizontal pressures determined by the angle of repose, height and density of the semi-fluid material. In the case of grain stored in buildings to a depth of fifteen feet, it has been determined that the elliptical pressure pattern to which the tunnel should be designed has a major semi-diameter equivalent to 700 pounds per square foot and a minor semi-diameter equivalent to 400 pounds per square foot. The United States Department of Agriculture requires grain ventilating tunnels to be capable of supporting such loads.

As the internal resistance of a pile of grain, or the coefficient of friction between particles of piled grain, is relatively high, the force necessary to move grain at the bottom of a pile of grain is much greater than the pressure exerted on the grain at the bottom of the pile due to the height of the pile of grain. This resistance to grain movement is known as the "passive resistance" of the grain. The present invention utilizes the "passive resistance" of piled grain in providing a ventilating tunnel which may be fabricated from extremely light-gage material and yet be capable of carrying heavy loads to meet design requirements such as the specifications of the United States Department of Agriculture, for example. The foregoing is achieved by forming the tunnel sections in the form of an arch or a curved beam from light-gage material. The gage of the material is such that the tunnel sections possess some but relatively small (as compared to the loads carried) beam strength and would fail by flexure when subject to bending loads much smaller than the designed grain loading. However, due to the cross-sectional shape of the tunnel sections and the action of the "passive resistance" of the grain, the tunnel sections do not fail by flexure when a mass of grain is piled to a height several times greater than the maximum permissible storage height set by the United States Department of Agriculture. This is so since the tunnel sections are arch-shaped in cross section and it is not possible for any part of a tunnel section to buckle inwardly of its perimeter without a concurrent outward buckling at another point unless the material fails in compression, and since the "passive resistance" of the overlying grain prevents outward buckling of the tunnel sections. Also, the tunnel sections are shaped so that their sides meet the supporting floor at an acute angle. This construction allows the "passive resistance" of the overlying grain to prevent inward collapse of the section due to horizontal pressures acting on its sides.

Since the "passive resistance" of the grain is greater than the pressures applied to the tunnel sections due to the height of the overlying grain, the tunnel sections will not fail until the applied pressures are such that the tunnel sections cease to act as arches or until the metal making up the tunnel sections fails in compression. It is well known that metals such as steel are capable of carrying extremely large loads before compressional failure of the metal occurs. Consequently, even when tunnel sections are fabricated from light-gage sheet metal material, such as No. 13 gage, in which the total cross-sectional area is small, the loads involved in the storage of grain are insufficient to cause failure of the metal in compression even when the normally anticipated loads be increased by a factor of four, for example.

In order to utilize the "passive resistance" of the grain in the construction of a ventilating tunnel, it is necessary that the tunnel sections be designed not to resist flexure. For example, tunnel sections constructed in accordance with the prior art include relatively large structural members designed to carry the heavy loads involved. These members are sufficiently rigid to prevent failure by flexure for all normally anticipated loads and the "passive resistance" of the grain cannot come into operation. For this reason, according to the present invention, the rigidity of the tunnel sections is made as low as possible consistent with the following requirements with respect to beam strength. It has been found that tunnel sections formed from sheet material not possessing some rigidity or stiffness do not maintain the necessary arch shape especially during transportation of the tunnel sections and when grain is being initially piled onto the tunnel sections. In the latter instance, the tunnel sections must necessarily include beam strength since the tunnel sections cannot support heavy loads by employing "passive resistance" of the grain until the tunnel sections are completely surrounded by the grain. Also, if the pile of grain is not symmetrical with respect to the tunnel sections, the tunnel sections would be subject to unbalanced loading and compensating beam strength would be required. The beam strength necessary is only a fraction of the beam strength that would be required to support normally anticipated grain loads without "passive resistance." In other words, the beam strength of the tunnel sections is not provided for the purpose of carrying the grain load as such, but only to insure that the tunnel sections will act as arches when non-uniformly loaded, for example.

It has also been found that the particular shape of the arch of the tunnel sections determines the maximum height of grain the tunnel sections may safely support. As mentioned above, grain acts as a semi-fluid and the ventilating tunnels are subject to an elliptical force pattern. Actually in the case of grain the force pattern is a semi-ellipse because there is no upward component of active pressure. A ventilating tunnel designed to meet the specifications of the United States Department of Agriculture, which requires the grain ventilating tunnel to be capable of supporting a vertical pressure of 700 pounds per square foot and a horizontal pressure of 400 pounds per square foot, the vertical and horizontal pressures being the loads applied on the ventilating tunnels due to the mass of the grain piled on top of the ventilating tunnel, need only be capable of supporting loads as determined by a semi-ellipse of pressure having a major semi-diameter equivalent to 700 pounds per square foot and a minor semi-diameter equivalent to 400 pounds per square foot. However, it has been discovered that additional forces exist which should be taken into consideration when designing grain ventilating tunnels. When grain is initially stored in a grain storage building, the grain may contain substantial moisture, and as discussed above, one of the purposes of a ventilating tunnel is to remove excessive moisture from the grain. When excessive moisture is removed, the grain becomes more solidly packed, resulting in an additional force being applied on the ventilating tunnel. Since the grain, upon shrinking when the undesired moisture is driven therefrom moves downwardly by the force of gravity, the additional force is substantially vertically applied. Also, in the case of stored grain having the desired percentage of moisture content, during periods of non-ventilation the moisture tends to migrate toward the top of the pile of grain and collect in relatively small regions at the top of the mass of grain. When this occurs the portion of the grain from which the moisture has migrated will become more solidly packed and produce an increase in the vertical force on the tunnel. The additional vertical force may be referred to as the "shrinkage force." The "shrinkage force" thus increases the vertical dimension of the semi-elliptical force pattern. By taking the "shrinkage force" into consideration, it is possible to more efficiently utilize the metal when designing a ventilating tunnel for grain storage buildings.

The foregoing will be more fully understood with reference to Fig. 4 of the drawings in which a semi-elliptical curve 40 is shown representing the semi-ellipse of pressure produced by a mass of grain establishing a vertical pressure of 700 pounds per square foot and a horizontal pressure of 400 pounds per square foot, the major semi-diameter 41 and the minor semi-diameter 42 of the semi-ellipse of pressure 40 being respectively equivalent to the vertical and horizontal pressures of the grain. This figure also includes an elongated semi-elliptical curve 43 which represents the semi-ellipse of pressure that would exist upon a change in the moisture content or moisture distribution in the grain with a pile of grain such that the mass of the grain exerts a vertical pressure of 700 pounds per square inch and a horizontal pressure of 400 pounds per square inch. The minor semi-diameter of the semi-ellipse of pressure 43 substantially corresponds to the minor semi-diameter 42 of the curve 40. However, the major semi-diameter 44 of the semi-ellipse of pressure 43 is substantially greater than the major semi-diameter 41 of the curve 40 as shown by the vertical component 45 which comprises the difference between the major semi-diameters of the semi-elliptical curves 40 and 43. The vertical component 45 represents the "shrinkage forces" discussed above. It is apparent from this graphical representation that grain ventilating tunnels cannot be properly designed by considering only the forces exerted on the ventilating tunnel due to the mass of the supported grain.

According to the present invention the shape of the arch of the tunnel sections is determined in accordance with the maximum semi-ellipse of pressure the tunnel sections are designed to support, such as the semi-ellipse of pressure 43 which, as discussed above, is a graphical representation of the force pattern corresponding to the specifications of the United States Department of Agriculture plus the "shrinkage forces." The pressures applied to points about the periphery of a ventilating tunnel subject to this force pattern are proportional to the magnitude of identifiable semi-diameters of the semi-elliptical curve 43.

Fig. 5 of the drawings graphically illustrates the forces and the magnitude of such forces applied to points on the periphery of a tunnel section lying in a transverse plane perpendicular to the longitudinal axis of the tunnel section when the tunnel section is subject to the semi-ellipse of pressure 43. In this figure the tunnel section is represented by an arch-shaped member 46 having its ends terminating on a horizontal line 47 which corresponds to the floor of a grain storage building. The total pressure acting upon the tunnel is represented by an envelope formed by broken line 48. Individual forces making up the envelope of total pressure are proportional to corresponding semi-diameters of the semi-ellipse of pressure 43. In particular, pressure vectors $a$, $b$, $c$, $d$, $e$, $f$, $g$, $h$ and $i$ shown in Fig. 5, respectively correspond to semi-diameters $j$, $k$, $l$, $m$, $n$, $o$, $p$, $q$, and $r$ of the semi-ellipse of pressure 43 and the magnitude of the vectors $a$ through $i$ are proportional to the magnitude of the respective semi-diameters. It is understood that only representative pressure vectors and corresponding semi-diameters are illustrated and that a pressure vector acts on each point of the periphery of the tunnel section of a magnitude proportional to a corresponding semi-diameter of the semi-ellipse of pressure 43.

The feature of the present invention of shaping the arch of the tunnel sections in accordance with the maximum semi-ellipse of pressure the tunnel sections are designed to support is accomplished by forming the arch to include sections having a radius of curvature inversely proportional to the magnitude of corresponding semi-diameters of the semi-ellipse of pressure. The most desirable arch shape may be obtained by forming the arch to include a large number of infinitesimal portions each having a radius of curvature inversely proportional to the magnitude of a semi-diameter of the semi-ellipse of pressure corresponding to the pressure vector applied to each infinitesimal portion. However, it is not necessary to form the shape of the arch in this manner in order to appreciate the advantages of the present invention. Instead of forming the radii of curvature of infinitesimal portions of the arch in accordance with corresponding individual semi-diameters of the semi-ellipse of pressure, a section of the arch including a measurable member of infinitesimal portions may be considered as a unit and be provided with a radius of curvature inversely proportional to the maximum semi-diameter acting on the arch section or to an average of the semi-diameters acting on the arch section. Preferably, but not necessarily, the former procedure may be followed in those cases where the semi-ellipse of pressure correctly portrays the pressures actually applied to the tunnel sections, while the shape of the arch could be obtained by the latter procedure in those cases where the semi-ellipse of pressure includes a known factor of safety.

The foregoing is illustrated in Fig. 5 in which the pressure vectors included within an area A equally disposed on opposite sides of the vertical axes of the tunnel sections are considered as a unit to determine the radius of curvature of a portion of the arch between points 49 and 50 upon which such pressure vectors are applied, the area A being defined by the upper portion of the curve 48 between points 51 and 52, the portion of the arch between points 49 and 50 and straight lines connecting points 49, 51 and 50, 52. As illustrated, the radius of curvature of the arch section 49—50 is inversely proportional to the pressure vector $e$ of maximum magnitude. As the major semi-diameter $n$ of the semi-ellipse of pressure corresponds to the maximum pressure vector $e$ and the latter is proportional to semi-diameter $n$, the radius of curvature of the arch section 49—50 is also inversely proportional to the major semi-diameter of the semi-ellipse of pressure. Thus the arch portion 49—50 is designed as if subject to a total pressure indicated by an area B bounded by a curved line 53 extending between points 54 and 55, the arch portion 49—50 and straight lines between points 49, 54 and 50, 55.

The radii of curvature of arch portions between points 49 and 56 on one side of the arch portions 49—50, and between points 50 and 57 on the other side of the arch portion 49—50, are inversely proportional to the maximum pressure vector applied to each arch portion 49—56 and 50—57. The total pressure applied to the arch portion 49—56 is represented by an area C defined by a portion of the curve 48 between points 51 and 58, by the arch portion 49—56 and by straight line connecting points 49, 51 and 56, 58. The pressure vector $d$ comprises the maximum pressure vector within the area C and the radius of curvature of the arch portion 49—56 is inversely proportional to the corresponding semi-diameter of the semi-ellipse of pressure 43 (Fig. 4). Thus the arch portion 49—56 is designed as if subject to a total pressure represented by an area D bounded by a curved line 59 extending between points 51 and 60, the arch portion 49—50 and straight lines between points 49, 51 and 56, 60. In this example the tunnel section is designed assuming symmetrical grain loading and the arch portions 49—56 and 50—57 are identical and symmetrically disposed with respect to the vertical axis of the tunnel section. Thus the arch portion 50—57 is subject to a total pressure represented by an area E, equal to the area C, and includes a radius of curvature equal to the radius of curvature of the arch portion 49—50 which is inversely proportional to the semi-diameter of the ellipse of pressure 43 corresponding to the maximum pressure vector $f$ in the area E, the latter pressure vector being equal to the pressure vector $d$. The area E is defined by a portion of the curve 48 between points 52 and 61, the arch portion 50—57 and straight lines connecting the points 50, 52 and 57, 61. Also, the arch portion 50—57 is designed as if subject to a total pressure represented by an area F equal to the area D. The area F is bounded by a curved line 62 extending between points 52 and 63, the arch portion 50—57 and straight lines connecting points 50, 52 and 57, 63. The radii of curvature of the remaining portions of the arch are determined by applying the foregoing principles. The remaining arch portion on the left-hand side of the vertical axis of the tunnel section, as viewed in the drawings, extends between point 56 and a point 64 lying on the horizontal line 47. This arch portion is subject to a total pressure represented by an area G formed by a portion of the curve 48 between points 58 and 65, the arch portion 56—64 and straight lines between points 56, 58 and 64, 65. The maximum pressure vector in the area G is represented by the line between points 56 and 58, and the radius of curvature of the arch portion 56—64 is inversely proportional to its corresponding semi-diameter of the semi-ellipse of pressure. The designed total pressure for this arch portion is represented by an area H defined by a curved line 66 extending between points 58 and 67, the arch portion 56—64 and straight lines connecting the points 56, 58 and 64, 67. The remaining arch portion on the right-hand side of the vertical axis is identical to the arch portion 56—64. The former arch portion lies between point 57 and a point 68 located on the horizontal line 47. Area I represents the total pressure on the arch portions 57—68, the area I being defined by a portion of the curve 48 between points 61 and 69, the arch portions 57—68 and straight lines between points 57, 61 and 68, 69. The radius of curvature of the arch portions 57—68 is inversely proportional to the semi-diameter of the semi-ellipse of pressure corresponding to the maximum pressure vector in the area I as represented by the line between points 57 and 61, and the designed total pressure for the arch portion 57—68 is shown by area J bounded by a curved line 70 extending between points 61 and 71, the arch portion 57—68 and straight lines connecting points 57, 61, and 68, 71.

As mentioned above, the sides of the tunnel section meet the supporting floor at an acute angle to prevent failure of the tunnel sections by inward buckling. This feature is illustrated in Fig. 5. As shown, the pressure vectors $a$ and $i$ applied to the supporting edges of the tunnel section are perpendicular to the surface of the tunnel section and are at an angle $\alpha$ with the horizontal line 47 or supporting floor. Thus there exists no component of force, parallel to the supporting floor, on the tunnel section due to the overlying grain. In addition, since the lower side portions of the tunnel sections are flared outwardly, the "passive resistance" of the grain prevents inward buckling of the arch structure.

It is to be expressly understood that the manner as disclosed and described above of forming the arch shape of the tunnel section by dividing the tunnel arch into arch portion 49—50, 49—56, 50—57, 56—64 and 57—68 and by determining the radius of curvature of each arch portion in accordance with the total pressure applied to each arch portion, is provided for the purpose of explaining the principles of the present invention and is not intended to limit the invention to the specific example. In some cases it may be desirable to divide the arch into a larger number of portions each including a smaller number of infinitesimal portions and to provide a different radius of curvature for each portion inversely proportional to the average magnitude of the semi-diameters, or to the semi-diameter of greatest magnitude corresponding to the pressure vectors applied to each portion. In other cases it may be desirable to practice the principles of the present invention by considering a less number of separate arch portions than in the specific example described above. Also, the relative relationship of the lengths of the arch portions 49—50, 49—56, 50—57, 56—64 and 57—58 is not to be considered limiting. In the design of certain tunnel sections it may be desirable to divide the arch into relatively smaller arch portions at the apex of the arch and relatively longer arch portions at its sides. Moreover, while the present invention has been disclosed in the design of a tunnel section intended to be symmetrically loaded, the principles of the present invention are applicable also to the design of tunnel construction intended to be subject to asymmetrical loading. The size, number and relative proportionment of the arch portions are determined, in part, by its required cross-sectional area, and by its height and width dimensions.

A grain ventilating tunnel made up of a number of tunnel sections constructed in accordance with the foregoing principles was found to be capable of withstanding over four times the depth of grain for which the tunnel was designed. The tunnel sections were made from pieces of 1½" x #10 mesh expanded metal made from No. 13 gage steel, in lengths of 4' 4", and were curved to form an arch having a height of 14.51 inches and a transverse dimension between the supporting edges of 22.30 inches. The arch included a medial 60° arc portion of 6-inch radius equally disposed about the vertical axis, an intermediate 30° arc portion on each side of the medial arc portion each having a 12-inch radius and terminating 16° 02' arc portions of 36-inch radius. This tunnel was designed to carry fifteen feet of grain but in actual tests was found to support before failure 19,983 pounds or 3,330 pounds per square foot. This is equivalent to sixty-seven feet of grain.

As mentioned above, the tunnel sections may be formed from materials other than expanded metal, the only requirement being that the materials possess adequate compressional strength as an arch member and that the arch members have some degree of beam strength. The tunnel section shown in Fig. 6 of the drawings includes an elongated arch structure 80 formed from a sheet of welded wire mesh bent into a specific arch shape according to the principles discussed above and disclosed in Figs. 4 and 5. The sheet of welded wire mesh includes a plurality of parallel longitudinally extending and transversely spaced rod members 81, and a plurality of parallel transversely extending and longitudinally spaced rod members 82. The rod members 81 and 82 are disposed at right angles to each other, and the longitudinal spacing between the rod members 82 is less than the transverse spacing between the rod members 81 to define a plurality of rectangular openings. The members 81 and 82 are welded together at their points of intersection to provide a rigid structure. Preferably, the rod members 82 are of a larger diameter than the rod members 81 since the rod members 82 are bent into arch form while the rod members 81 extend longitudinally of the structure.

A screen 83 of fine mesh is positioned over the outer surface of the elongated arch structure 80 to provide a support for the overlying grain. The edges of the screen may be secured along the supporting edges of the elongated structure by means of open-topped channel members 84 which function to clamp the edges of the screen onto the edges of the elongated structural member in a manner similar to the arrangement shown in Fig. 2.

A still further form of an elongated arch structure is shown in Figs. 7 and 8. In this embodiment the arch structure is made from a piece of sheet metal 93 provided with stamped openings 94 which provide for air passage therethrough. The openings 94 are formed to present inwardly directed flanges 95 which stiffen the sheet metal and provide adequate beam strength. For the latter purpose concave reinforcing grooves 96 may also be provided. The reinforcing grooves also lie in spaced parallel planes perpendicular or inclined with respect to the longitudinal axis of the tunnel section. In both of these modifications fine mesh screen is positioned over the tunnel structure to prevent the grain from flowing to within the tunnel through the openings in the wall structure.

In Figs. 9 and 10 there is shown another arrangement for joining the arch-shape maintaining means 30 to the sheet metal 25 when in the form of non-flattened expanded metal. In this arrangement the outer periphery of the arch portion 31 rests against the inner surface of the outermost segment 97 of the sheet of expanded metal, while the inside surface of the arch portion 31 rests against or abuts shoulders 98 formed at the point of connection between contacting portions of the outermost segment 97 and the segment 99 adjacent thereto. The arch portion 31 may be welded to the sheet metal in the region of the shoulders 98 to form a permanent and rigid construction.

Another embodiment of the invention is shown in Figs. 11 through 14. A tunnel section 100 is disclosed including a helical structural member 101 covered by fine mesh wire 102. The helical structural member 101 is formed from small diameter wire and normally occupies a collapsed position for shipment or storage in which each of the loops or convolutions 103 are adjacent each other as illustrated in Fig. 12. When it is desired to erect the tunnel section, the helical structure 101 is expanded in the manner shown in Fig. 11 and the fine mesh wire 102 is then wrapped around the helical structural member and clamped thereto to retain the helical structural member in its expanded position. For this purpose the ends of the covering screen 102 may be wrapped around and clamped onto the end convolutions 104 and 105 of the helical structural member 101. A plurality of C-shaped spring clamps 106 of the type shown in Fig. 13 may be employed for this purpose.

A plurality of tunnel sections of the type shown in Fig. 11 are adapted to be placed together in overlying end-to-end relationship to form an elongated ventilating tunnel of desired length. For this purpose, one end of each tunnel section is of tapered construction and adapted to extend within the untapered end of another tunnel section. This arrangement is shown in Fig. 14 in which the last two or three convolutions 105, 107 and 108 of the helical structural member 101 are made of gradually reduced size so that the tunnel sections at this end may be inserted into an untapered end of another tunnel section.

The helical structural member 101 and the screen covering 102 clamped thereto function as a unitary structural assembly which is capable of carrying extremely heavy grain loads with the aid of the "passive resistance" of the grain in a manner similar to the discussion presented above relative to the other forms of tunnel sections. Each of the convolutions includes a horizontal base portion 110 provided with leg portions 115 adapted to rest upon the supporting floor of the grain storage building, and an arched portion 111. In order to provide a tunnel section formed from wire of a given gage that is capable of carrying maximum grain loads, the convolutions of the helical structural member 101 may be arch-shaped in a manner previously discussed and disclosed in Figs. 4 and 5. Thus each convolution may be made up of a plurality of arc sections of different radii of curvature having a definite relationship to the loads applied to the tunnel section as represented by the semi-diameters of the semi-ellipse of pressure 43 shown in Fig. 4.

In the tunnel section shown in Fig. 11 the horizontal base portions 110 are parallel to each other and are inclined with respect to the longitudinal axis of the helical structure. Each arch portion 111 is connected at one of its ends to an end of a base portion on one side of the structure and at its other end to an end of an adjacent base portion on the other side of the structure. The arch portions lie in parallel planes, which may be curvilinear, inclined with respect to the longitudinal axis of the helical structure in a manner opposite the inclination of the base portions. In order for the helical structure to be contracted to a closed position as shown in Fig. 12 in which adjacent convolutions contact each other throughout their perimeters, the base portion and the arch portion are provided with equal leads. That is, the distance measured along the longitudinal axis of the structure between opposite ends of each base portion equals the distance measured along the longitudinal axis between the ends of the arch portions. Stated differently, the distance measured along the longitudinal axis between the ends of each base portion is equal to the distance between the end of each base portion on one side of the structure and the end of an adjacent base portion on the other side of the structure. It is to be expressly understood that the helical structural member 101 need not be fabricated in this manner. In alternate arrangements the base portions may be parallel to each other and perpendicular to the longitudinal axis or the arch portions may be so disposed, or the base and arch portions may both be inclined with respect to the longitudinal axis of the helical structure. For convenience in clamping the ends of the covering screen 102 to the end convolutions of the helical structural member 101, the end convolutions may be formed to lie in a plane perpendicular to the longitudinal axis of the tunnel section.

There is thus provided by the present invention a novel grain ventilating tunnel made up of a plurality of similar tunnel sections adapted to be placed in overlapping end-to-end relation. The tunnel sections may be fabricated from light-gage sheet metal including a plurality of openings therein for the passage of air through the walls of the tunnel. The light-gage sheet metal is designed to possess some beam strength so that when bent in the form of an arch the resulting elongated arch structure will act as a non-rigid arch or curved beam tending to deflect when under load and allow the "passive resistance" of the grain to prevent failure of the tunnel section by flexure of the arch structure. The tunnel sections may carry loads up to the permissible compressional strength as an arch of the material forming the tunnel sections; such loads being greatly in excess of the maximum load the tunnel sections may carry without the passive resistance; i.e. before failure by flexure. The shape of the arch of the tunnel sections is determined in accordance with the semi-elliptical force pattern to which grain ventilating tunnels are subject. This feature provides the most efficient arch shape and allows the tunnel section to carry the greatest possible loads for the type and quantity of material employed. According to the present invention, this semi-elliptical force pattern includes a vertical component or "shrinkage force" which materially elongates the force pattern, and the arch is S shaped to include arc sections having radii of curvature varying inversely with the magnitude of corresponding semi-diameters of the semi-elliptical force pattern. The elongated arch structural members may be fabricated from different materials, the only requirement being that light-gage material having some degree of beam strength be employed; the light-gage material reducing the cost of the tunnel sections and the degree of beam strength providing tunnel sections that will act as curved beams within the limits of unbalanced grain loading, for example, without providing a rigid structure not allowing operation of the "passive resistance" of the stored grain.

Although several embodiments of the invention have been disclosed and described above, it is to be expressly understood that various changes and substitutions may be made therein without departing from the spirit of the invention, as well understood by those skilled in the art. For example, although the present invention has been described in the environment of a grain ventilating tunnel for use in ventilating stored grain, it may be used equally well for ventilating other granular materials including chemicals, by conducting air or other gases through the material. Reference therefore will be had to the appended claims for a definition of the limits of the invention.

What is claimed is:

1. A tunnel section adapted to be placed in overlying end-to-end relation with similar tunnel sections to form a ventilating tunnel for use in ventilating granular material, comprising an elongated substantially non-rigid arch structure consisting of a piece of sheet material formed into the shape of an arch, the length of the arch structure corresponding to the length of the sheet material and the perimeter of the arch structure corresponding to the width of the sheet material, and an arch maintaining structure joined to the elongated arch structure, the arch maintaining structure including an arch member having an arch shape corresponding to the arch shape of the elongated arch structure and being joined to the elongated arch structure and reinforcing means connected to the arch member to stiffen the arch member and render the arch member more rigid than the elongated arch structure, the sheet material having openings therein forming passageways for ventilating gas to flow through the walls of the tunnel section.

2. A tunnel section adapted to be placed in end-to-end relation with similar tunnel sections to form a ventilating tunnel for use in ventilating granular material, comprising an elongated arch structure formed from material having openings therein for the passage of ventilating fluid through the walls of the tunnel section, the elongated arch structure being shaped to include a plurality of longitudinally extending arc segment portions of different radii of curvature and having a pair of spaced longitudinal edges, the arc segment portions adjacent the spaced longitudinal edges having a radii of curvature greater than the radii of curvature of the remaining arc segment portions and the radii of curvature of the remaining arc segment portions decreasing as the space between the remaining arc segment portions and the longitudinal edges of the tunnel section increase.

3. A tunnel section adapted to be placed in end-to-end relation with similar tunnel sections to form an elongated ventilating tunnel for use in ventilating granular material, comprising an elongated arch structure formed from sheet material having openings therein for the passage of ventilating fluid through the walls of the tunnel section; the elongated arch structure being shaped to include a plurality of longitudinally extending arc segment portions; the arc segment portions including a medial arc segment portion located at the apex of the elongated arch structure in substantial symmetrical relation with the vertical axis of the tunnel section, a pair of intermediate arc segment portions located on opposite sides of the vertical axis and joined to longitudinal edges of the medial arc portion and a pair of end arc segment portions located on opposite sides of the vertical axis and joined to longitudinal edges of the intermediate arc segment portions; the radii of curvature of the end arc segment portions being greater than the radii of curvature of the intermediate arc segment portions and the radii of curvature of the intermediate arc segment portions being greater than the radius of curvature of the medial arc segment portion.

4. A tunnel section adapted to be placed on the floor of a granular material storage building to support a predetermined pile of granular material covering and loading the tunnel section and applying an envelope of pressure on the tunnel section formed by a plurality of pressure vectors established in accordance with semi-diameters of the semi-ellipse of pressure of the pile of granular material, comprising an elongated arch structure formed from material having openings therein for the passage of ventilating fluid through the walls of the tunnel section, the elongated arch structure including a plurality of longitudinally extending arc segment portions of different radii of curvature, the radii of curvature of the arc segment portions being inversely proportional to a semi-diameter of the semi-ellipse of pressure of the predetermined pile of granular material corresponding to a pressure vector within portions of the envelope of pressure in contact with respective arc segment portions.

5. A tunnel section adapted to be placed on the floor of a granular material storage building and support a predetermined pile of granular material covering and loading the tunnel section and applying an envelope of pressure on the tunnel section formed by a plurality of pressure vectors established in accordance with semi-diameters of the semi-ellipse of pressure of the pile of granular material, comprising an elongated arch structure formed from material having openings therein for the passage of ventilating fluid through the walls of the tunnel section, the elongated arch structure including a plurality of longitudinally extending arc segment portions of different radii of curvature, the radii of curvature of the arc segment portions being inversely proportional to the semi-diameter of the semi-ellipse of pressure corresponding to the greatest pressure vector within portions of the envelope of pressure in contact with respective arc segment portions.

6. A tunnel section as defined in claim 1 in which the piece of sheet material comprises expanded sheet metal having openings therein forming passageways for the ventilating gas to flow through the walls of the tunnel section.

7. A tunnel section as defined in claim 6 in which the openings in the expanded sheet metal have one dimension substantially greater than the other dimension, and in which the expanded sheet metal is bent to form the arch structure with the one dimension of the openings extending in the direction of curvature of the arch and with the other dimension of the openings extending longitudinally of the tunnel section.

8. A tunnel section as defined in claim 2 in which said material having openings comprises wire mesh material including a first plurality of rod members each bent in the form of the arch structure and spaced in parallel relation along the length of the section and a second plurality of spaced parallel rod members extending along the length of the section and joined to the first plurality of rod members, the first plurality of rod members being of relatively heavy gauge material as compared to the second plurality of rod members.

9. A tunnel section as defined in claim 2 in which said material having openings comprises a piece of sheet metal having openings therein to form the passageways with the openings being defined by flanges depending outwardly from the plane of the sheet material, and including a plurality of reinforcing ribs extending transversely of the arch structure.

References Cited in the file of this patent

UNITED STATES PATENTS

| | | |
|---|---|---|
| Re. 24,026 | Wise | June 21, 1955 |
| 678,216 | Baker | July 9, 1901 |
| 1,286,265 | Fair | Dec. 3, 1918 |
| 1,319,267 | Brown | Oct. 21, 1919 |
| 1,339,437 | Dickelman | May 11, 1920 |
| 1,379,001 | Diven | May 24, 1921 |
| 1,781,608 | Stroble | Nov. 11, 1930 |
| 2,196,391 | Gronert | Apr. 9, 1940 |
| 2,572,955 | Schumacher | Oct. 30, 1951 |
| 2,705,910 | Collins et al. | Apr. 12, 1955 |

FOREIGN PATENTS

| | | |
|---|---|---|
| 13,461/28 | Australia | Jan. 15, 1929 |